(12) United States Patent
Gasbarro

(10) Patent No.: US 6,308,232 B1
(45) Date of Patent: Oct. 23, 2001

(54) ELECTRONICALLY MOVEABLE TERMINATOR AND METHOD FOR USING SAME IN A MEMORY SYSTEM

(75) Inventor: James Anthony Gasbarro, Mountain View, CA (US)

(73) Assignee: Rambus Inc., Los Altos, CA (US)

( * ) Notice: Subject to any disclaimer, the term of this patent is extended or adjusted under 35 U.S.C. 154(b) by 0 days.

(21) Appl. No.: 09/387,842

(22) Filed: Sep. 1, 1999

(51) Int. Cl.[7] .................................................... G06F 13/00
(52) U.S. Cl. ................................................ 710/100; 326/30
(58) Field of Search .................................. 710/100, 101, 710/102, 103, 104; 326/30; 711/100, 170

(56) References Cited

U.S. PATENT DOCUMENTS

| | | | |
|---|---|---|---|
| Re. 36,789 | * | 7/2000 | Mandel et al. .......................... 326/30 |
| 5,313,595 | * | 5/1994 | Lewis et al. .......................... 710/126 |
| 5,382,841 | * | 1/1995 | Feldbaumer ............................. 326/30 |
| 5,635,852 | * | 6/1997 | Wallace ................................. 326/30 |
| 6,029,216 | * | 2/2000 | Hoglund et al. ...................... 710/101 |
| 6,100,713 | * | 8/2000 | Kalb et al. .............................. 326/30 |

* cited by examiner

*Primary Examiner*—Glenn A. Auve

(57) ABSTRACT

An expandable memory system having a plurality of memory devices, each with an electronically activated terminator is disclosed. Also a method for detecting the last memory device arranged along a data bus connecting a memory controller with the memory devices, and activating its active terminator is disclosed.

17 Claims, 7 Drawing Sheets

US 6,308,232 B1

ELECTRONICALLY MOVEABLE TERMINATOR AND METHOD FOR USING SAME IN A MEMORY SYSTEM

FIELD OF THE INVENTION

The present invention relates to high speed memory systems. More particularly, the present invention relates to an expandable high speed memory system having an electronically moveable terminator.

BACKGROUND OF THE INVENTION

Persistent demand for improved memory performance has resulted in the recent development of conventional memory systems capable of providing significantly higher data throughput. FIG. 1 illustrates such a conventional memory system in a simple block diagram. The memory system includes a memory controller (M) for writing data into and reading data from memory devices (D) via a bi-directional data bus. The memory system is configured with at least one memory device, but not more than N memory devices connected to the data bus having a predetermined characteristic impedance.

The bi-directional data bus comprises a number of signal lines, but for simplicity, only one signal line is shown in the drawings. Each signal line terminates at one end at an Input/Output (I/O) pin of the memory controller and terminates at the other end at a resistive terminator (T). The resistance of terminator (T) is closely matched to the loaded impedance of the signal line in order to minimize reflections on the signal line and absorb signals sent down the signal line towards the terminator. The other end of the terminator (T) is connected to a voltage supply ($V_T$) which provides an AC ground and sets the DC termination voltage on the signal line.

Because the signal line is nominally pulled to the value of the termination voltage, this voltage can serve as one of the logical states for digital signals transmitted on the signal line. Switched current sources, such as open drain NMOS devices, can then be used as the signal driver circuits in either the master or memory devices. These simple signal drivers produce the logical data signals by either shutting off or sinking current as required to produce the logical states ("1" and "0"). For example, the termination voltage ($V_{HI}$) can serve as the high voltage state and low logical state "0", and a low voltage state ($V_{LO}$) can serve as the high logical state "1" where $V_{LO}=(V_T-I_O Z_L)$ and $I_O$ is the nominal current sunk by a current source driver when it is turned "ON."

Use of this data signaling scheme has at least two benefits. First, no power is required to produce one of the logical states ($V_{HI}$). Second, the current source drivers provide a high output impedance to the signal line, thereby minimizing signal energy loss as signals on the signal line propagate past the memory devices toward either end of the data bus.

When the memory controller transmits signals to one or more of the memory devices, it "sees" the full impedance, $Z_L$, of the signal line and produces full swing signals of magnitude $V_{SWING}=(V_{HI}-V_{LO})$ that travel down the signal line. As long as the I/O pins to the memory devices form short stubs terminated in a high impedance, little energy is lost and minimal parasitic reflections are produced as the signals propagate down the signal line and pass by the memory devices. As a rule of thumb, the stubs can be considered short if their electrical lengths are shorter than the rise and/or fall times of the signals. The signals transmitted by the memory controller propagate down the signal line, pass by all the memory devices, where they can be sensed, and eventually terminate at the terminator.

The situation is somewhat different when a memory device transmits to the memory controller. Each driver circuit in the memory device effectively "sees" two signal lines; one traveling towards the memory controller, and the other traveling towards the terminator. Thus, the net impedance seen by each driver circuit is ½ $Z_L$. Assuming the driver circuits in the memory devices also sink $I_O$ current, the signals that emerge from the memory device I/O pins split at the signal line with half the signal voltage traveling towards the memory controller and half the signal voltage traveling towards the terminator. The half-$V_{SWING}$ signals that travel towards the terminator pass by any intervening memory devices and then simply terminate at the matched impedance of the terminator. However, the half-$V_{SWING}$ signals that travel towards the memory controller pass by any intervening memory devices and then encounter open circuits when they reach the memory controller I/O pins. This effectively open circuit condition causes the signals from the memory device to double in voltage at the memory controller I/O pins as the signal energy is reflected back down the signal line towards the terminator. Thus, although only half the normal signal voltage is sent by the memory devices towards the memory controller, the memory controller still receives a full voltage swing signal at its I/O pins due to the signal reflection. This is true provided the signal line terminates in a high impedance (i.e., an open circuit) at the memory controller. The other memory devices in the system will see half-normal amplitude signals pass by their I/O pins at least twice per memory device transmission. However, since the memory system is designed to transmit data from a memory device to the memory controller, and not between memory devices, this signal line condition is acceptable. Accordingly, no matter which device in the memory system is transmitting data, a full swing signal appears at the input of the intended receiving device.

The foregoing description has been made with reference to the exemplary memory system shown in FIG. 1 and in the context of individual memory devices (D) populating the data bus. However, practical memory systems often populate the data bus with memory modules, rather single memory devices. Accordingly, as shown in FIG. 2, each junction along the data bus may be occupied by a memory module comprising multiple individual memory devices.

Whether the memory system populates the data bus with memory devices or with memory modules having a plurality of memory devices, each memory device in the system is specifically assigned and subsequently identified by a device identification (ID). For example, each memory device may contain a device identification (ID) register which is assigned a unique device ID by the memory controller upon memory system initialization. During subsequent memory system operations, each memory device is activated and communicates data with the memory controller in accordance with this device ID.

As can be appreciated from the foregoing, memory system impedance is a critical system design and performance parameter. Absent a careful balance between the various memory system components noted above, the signal line impedance will depart from its desired impedance. A signal line impedance mismatch will result in unwanted signal reflections from the terminator, and in increased signal line noise associated with such undesired reflections. Increased signal line noise may, at some point, preclude discrimination of data signals at the memory devices or memory controller. This need to match signal line impedance has, to date, precluded the implementation of a truly expandable high speed memory system. That is, because the signal line impedance will necessarily change with additional loading caused by the connection of additional memory devices or memory modules to the data bus, memory system expansion required a high level of technical support and significant hardware level intervention, such as swapping out the existing terminator with a new terminator having an impedance consistent with the additional loading.

Alternatively, a physically moveable terminator can be placed between the populated portion of the data bas which has a first impedance and the unpopulated portion of the data which is terminated in a predetermined impedance and has a second impedance different from the first. This physically moveable terminator, or impedance balancing connector, is inserted in the first unoccupied "slot" on the data bus in order to maintain proper data bus impedance under variable loading conditions. U.S. Pat. No 4,595,923 more fully explains this approach.

Both of these conventional approaches to maintaining signal line impedance following the connection of additional devices require direct technician intervention. That is, a trained technician employing a special, additional part (i.e., a new terminator or an impedance balancing connector) is required to maintain signal line impedance and compensate for the additional signal line loading.

In a commercial market where customers demand the ability to customize memory system capacity and/or upgrade memory system capacity in the field, a requirement for direct technician intervention is unacceptable. Personal computer (PC) manufacturers also demand a readily definable and easily expandable memory system which may be factory configured with nearly any reasonable number of memory devices, without the requirement to customize or compensate for variable signal line impedance concerns.

SUMMARY OF THE INVENTION

The present invention provides a readily expandable, high-speed memory system. Expansion is contemplated for memory systems incorporating a plurality of memory devices, memory modules, or slots along a data bus. By use of an active terminator, a memory controller may balance data bus impedance when one or more additional memory devices, memory modules are added to a memory system.

In one aspect, the present invention provides a memory system comprising; a memory controller connected to a plurality of memory devices (or memory modules) via a data bus, the data bus comprising a first portion having a first impedance, and a second portion having a second impedance, wherein at least one of the plurality of memory devices (or memory modules) comprises an active terminator having a third impedance, such that upon activation of the active terminator, the third impedance is placed in parallel with the second impedance to balance the first and second impedances.

In another aspect, the present invention provides a memory system comprising; a memory controller connected to a data bus, the data bus comprising a plurality of slots, each slot adapted to receive a memory module and comprising an active terminator responsive to a control signal from the memory controller.

In yet another aspect, the present invention provides a method of balancing impedance between first and second portions of a data bus in a memory system, the memory system comprising a memory controller and a plurality of memory devices connected via a serial initialization line and a channel including the data bus, the method comprising; determining in the memory controller one memory device located last on the data bus, and activating an active terminator in the one memory device to balance the first and second portions of the data bus.

DETAILED DESCRIPTION OF THE INVENTION

Figure 1:
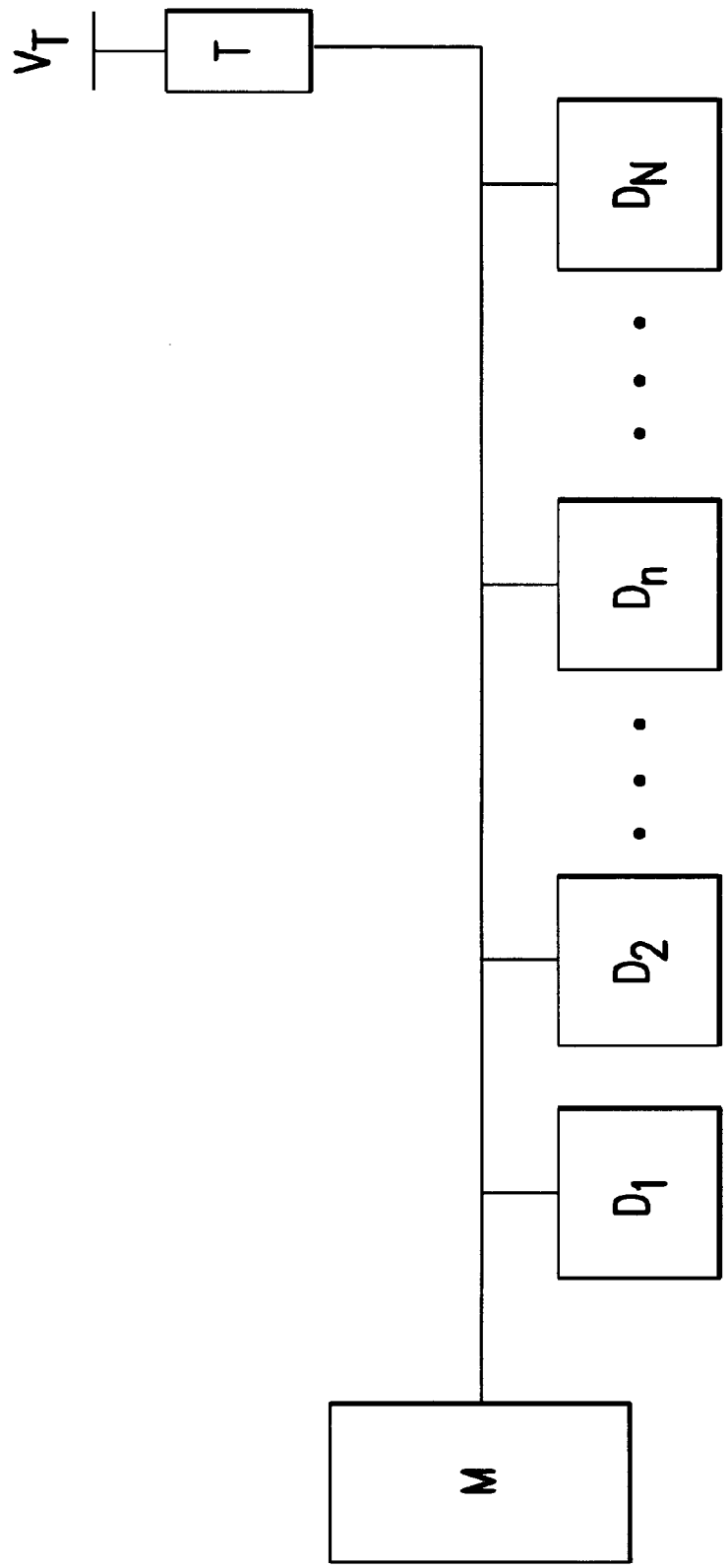
FIG. 1 is a block diagram of a conventional memory system incorporating memory devices on the data bus.
Figure 2:
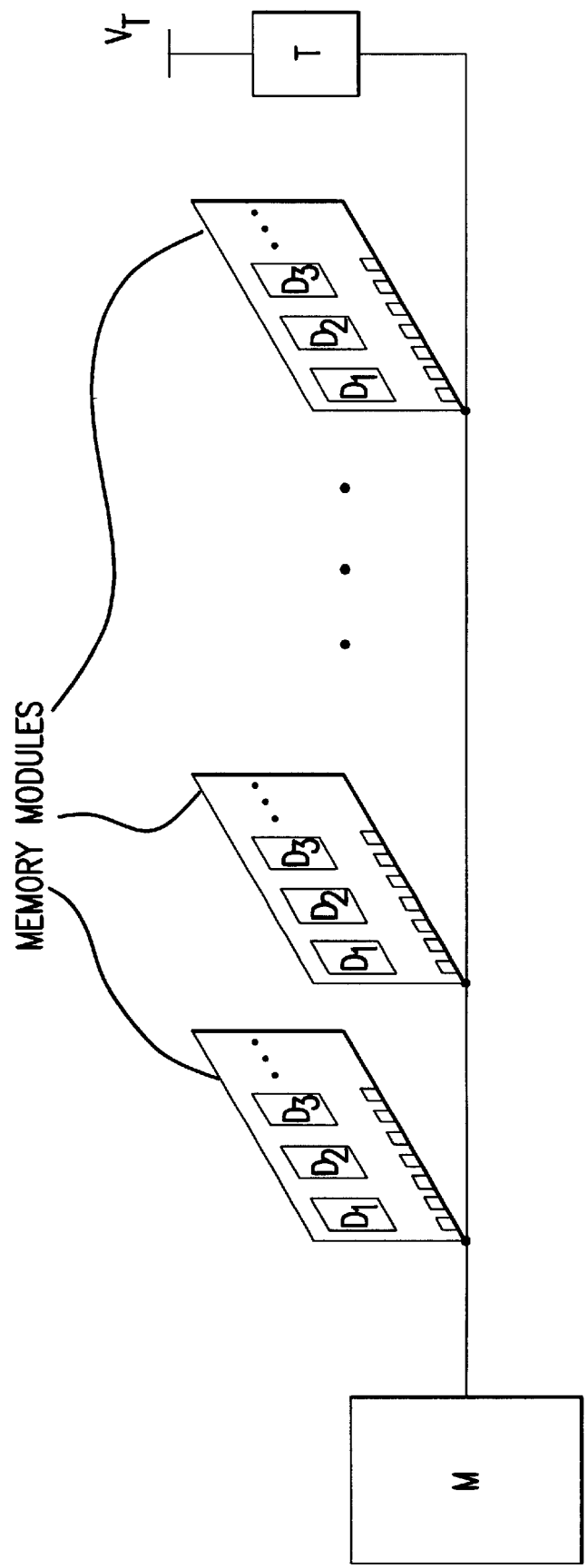
FIG. 2 is a block diagram of a conventional memory system incorporating memory modules on the data bus.

A high speed memory system is disclosed which incorporates an electronically moveable terminator. The electronically moveable terminator is a switchable component preferably associated with a memory device, a memory module, or a slot associated with memory system data bus. The term "data bus" as used throughout denotes one or more signal lines by which data is communicated between a memory controller and one or more memory devices or memory modules. It is recognized that the actual data bus may be part of a larger channel which includes additional signal lines carrying address and control information, or which comprises a multiplexed set of signal lines carrying data information, control information, and address information.

The term "memory controller" is used to describe a broad class of generic and application specific processing devices which are capable of reading data from, and writing data to one or more memory devices.

The phrase "electronically moveable" is used to describe the ability of the switchable component to respond to control signals sent from the memory controller or some other command device. This phrase also serves to highlight the distinction between the present invention and the conventional, physically moveable terminating components explained above.

Conceptually, the present invention provides a system and method by which a number of memory devices, memory modules, or data bus slots are implemented with the foregoing switchable component. The switchable component may take many forms and several examples are given below. Regardless of its actual form or the nature of the device into which it is incorporated, the switchable component will be referred to as an "active terminator." Any one of the memory devices, memory modules, or data bus slots incorporating the active terminator may be switched or "activated" by the memory controller to provide the data bus impedance necessary for proper memory system operation.

Typically, each memory device or memory module will incorporate an active terminator so that "standard" parts may be manufactured and placed, without data bus impedance related distinctions, anywhere along the data bus. Once the data bus has been populated with an appropriate number of memory devices or memory modules, the last one of these devices will have its active terminator activated, i.e, switched ON. This system and method will be discussed in additional detailed below with reference to several exemplary embodiments. These embodiments are drawn from presently preferred memory system configurations. They have been simplified in many ways to focus the following discussion on the present invention and not on other well understood aspects of memory system design. The examples must be given in some context in order to be useful. However, the present invention is not limited to the teaching context or the specific exemplary embodiments presented. Memory system design is by its very nature is a flexible and evolving endeavor. Thus, many variations to the simple examples given below are contemplated within the scope of the present invention as it is defined by the claims below.

Figure 3:
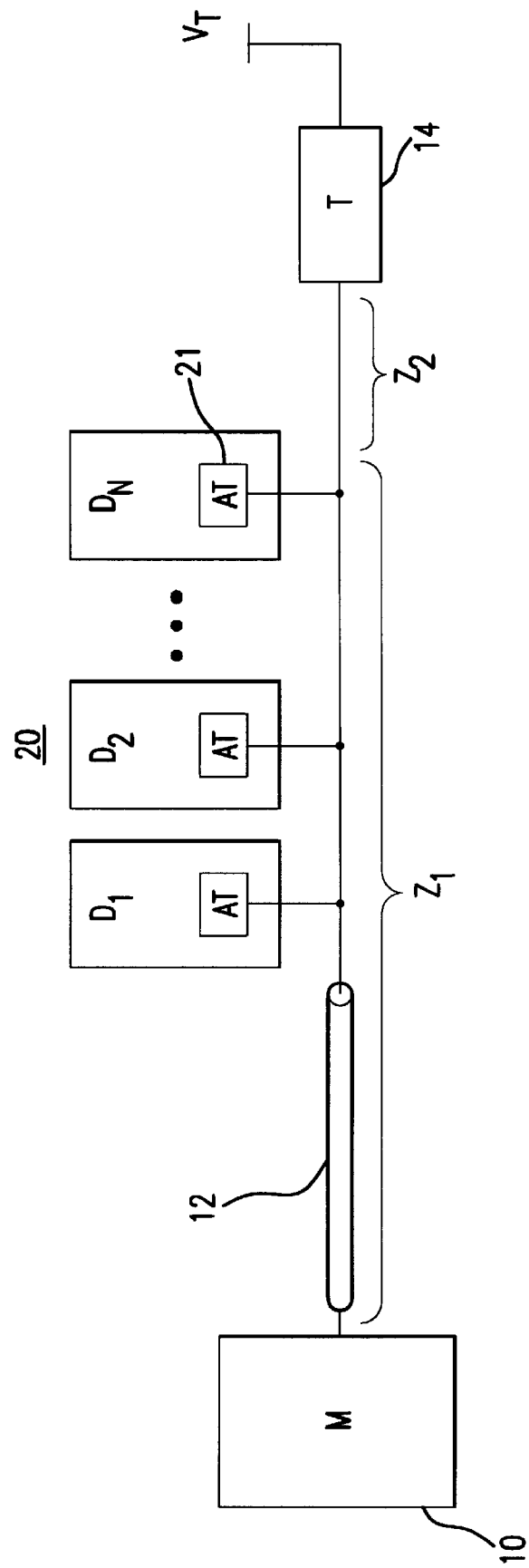
FIG. 3 is a block diagram of a memory system incorporating memory devices according to the present invention.

FIG. 3 is a block diagram of a memory system according to the present invention in which a memory controller 10 is connected to a plurality of memory devices 20 (including $D_1, D_2, \ldots D_N$), each memory device incorporating an active terminator 21. The memory devices are connected by and positioned along a data bus 12 which terminates into a terminator 14 connected to a terminal voltage $V_T$. Impedance along data bus 12 may be viewed as having two components; a first component $Z_1$ between the memory controller and the "last" memory device $D_N$, and a second component $Z_2$ between $D_N$ and the data bus terminator.

The designation "last" or memory device "$D_N$" will be used in the following examples to indicate the memory device (or the memory module in subsequent examples) last placed on the data bus. Conventionally, this memory device will be placed in a position farthest from the memory controller along the data bus. This is, however, only a present convention adopted to minimize the signal travel time between the memory controller and the memory devices on the bus.

The impedance $Z_1$ is typically different from impedance $Z_2$. Ideally, $Z_1$ and $Z_2$ should have the same impedance to avoid undesired signal reflections on the data bus, and unbalanced signal propagation by memory devices onto the data bus. The presence of an active terminator in memory device $D_N$ provides the memory system with an ability to equalize these impedances and balance the respective portions of the data bus. In effect, $Z_1 = Z_{AT} \| Z_2$, where $Z_{AT}$ is the internal impedance of the active terminator in memory device $D_N$ when it is switched ON. In one presently preferred example, the combined loaded impedance for $Z_1$ is about 25 ohms. The impedance of $Z_2$ is typically 50 ohms. Accordingly, the impedance of $Z_{AT}$ is defined to be 50 ohms.

Thus, once the data bus is populated with a desired number of memory devices, the active terminator of the last memory device is activated to equalize $Z_1$ and $Z_2$. Data bus impedance is not dependent on a static, predefined number of memory devices arranged along the data bus. Further, when one or more additional memory devices are added to the data bus, there is no requirement to alter data bus terminator (T) or rearrange a physically moveable terminator on the data bus. Rather, upon system initialization following the connection of additional memory devices, the memory controller will recognize the new "last" memory device $D_N$, and turn ON the corresponding active terminator. This electronic "moving" of the terminator is preferably done as part of the conventional memory system initialization routine which recognizes and identifies the resources in the memory system.

Figure 4:
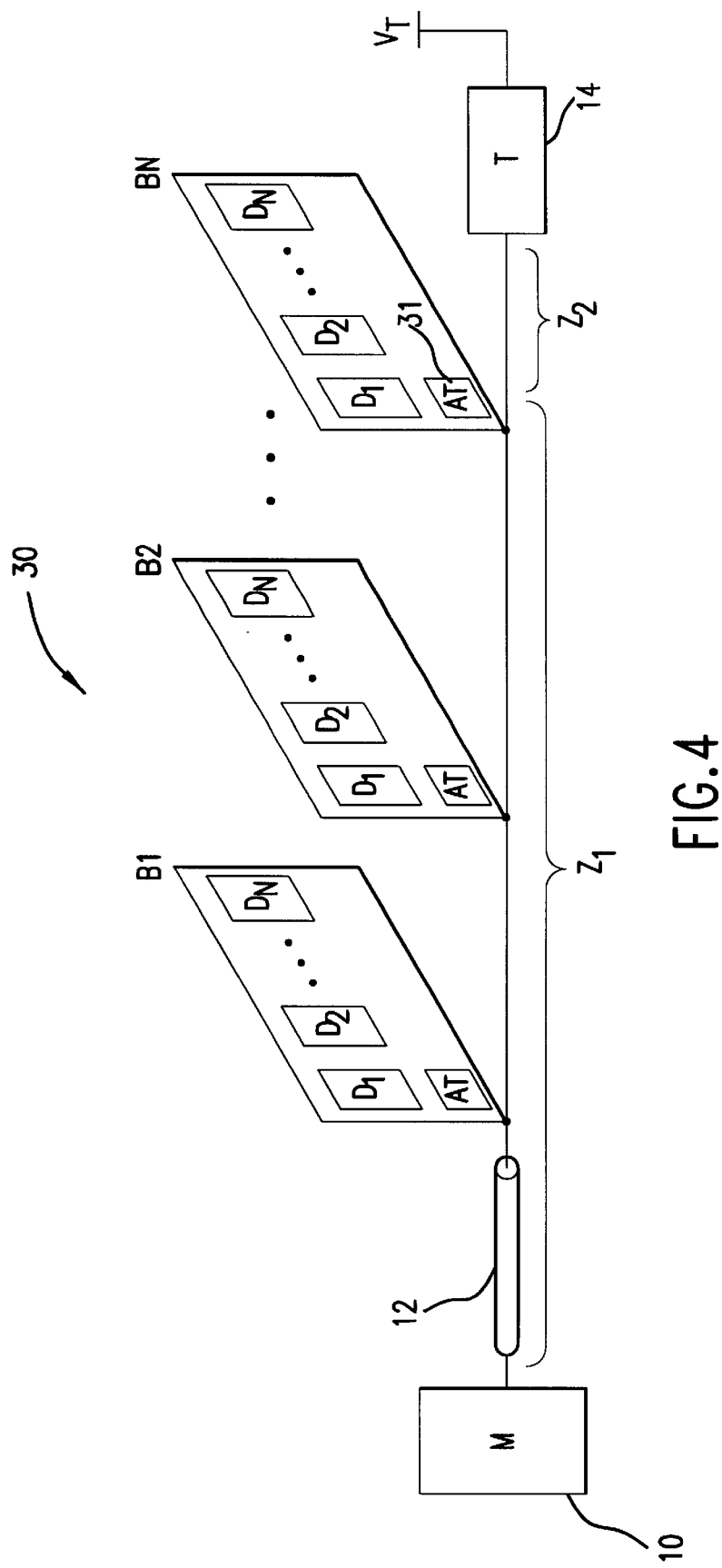
FIG. 4 is a block diagram of a memory system incorporating memory modules according to the present invention.

An analogous example in which the memory system comprises one or more memory modules 30 (including $B_1, B_2, \ldots B_N$) is shown in FIG. 4. Here, each memory module preferably comprises one or more memory devices ($D_1, D_2, \ldots D_N$) and an active terminator 31. Many memory systems rely on memory modules of various construction to provide sufficient data bandwidth to the memory controller during read/write operations, memory device redundancy, etc. Each memory module connects to the data bus via a slot. The term "slot" is used to generically indicate any electrical and/or mechanical assembly by which a memory device or memory module is functionally connected to the data bus. Slots include ports, chip sockets, parallel connector couples, etc. Typically, a data bus configured to receive one or more memory devices or modules will include a corresponding number of slots.

Within the present invention, the active terminator on the last memory module $B_N$ will be switch ON by the memory controller during memory system initialization. Thus, as described above $Z_1$ and $Z_2$ are equalized to preclude undesired signal reflections on the data bus.

Figure 5:
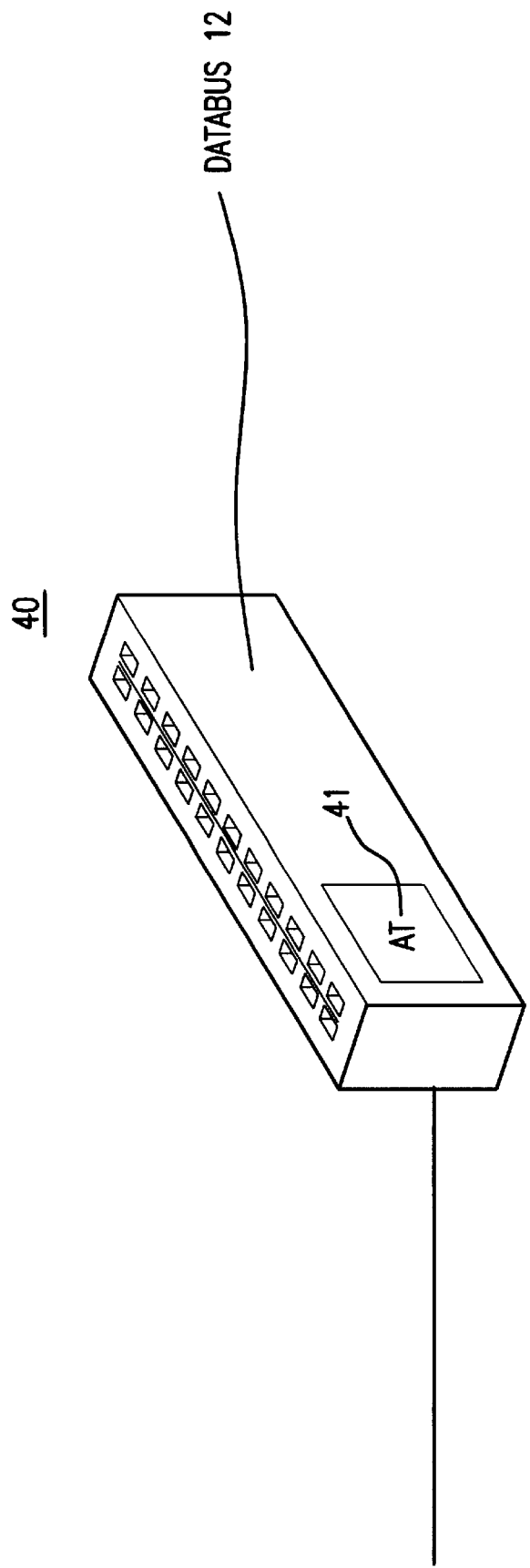
FIG. 5 is a schematic diagram illustrating another aspect of the present invention in which an active terminator is associated with a data bus slot.

Alternatively, the active terminator may be associated with each slot along the data bus as illustrated in FIG. 5. Here, rather than relying on the memory device or module (which may be manufactured by a number of different vendors) to provide the active terminator, the memory system incorporate an active terminator 41 into each data bus slot 40. The last slot filled (or populated) by a memory module will receive a signal from the memory controller during memory system initialization to turn ON the active terminator.

Figure 6B:
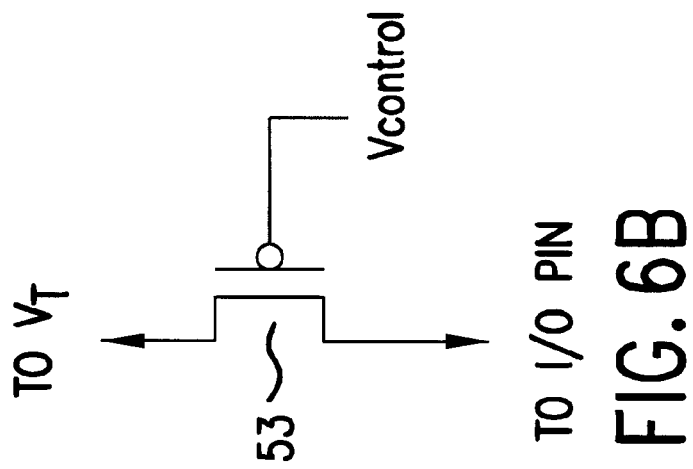
FIGS. 6A and 6B show exemplary circuits which implement the active terminator used in the present invention; and, FIG. 7 is a block diagram illustrating the control connects between the memory controller and a plurality of memory devices in a memory system according to the present invention.
Figure 6A:
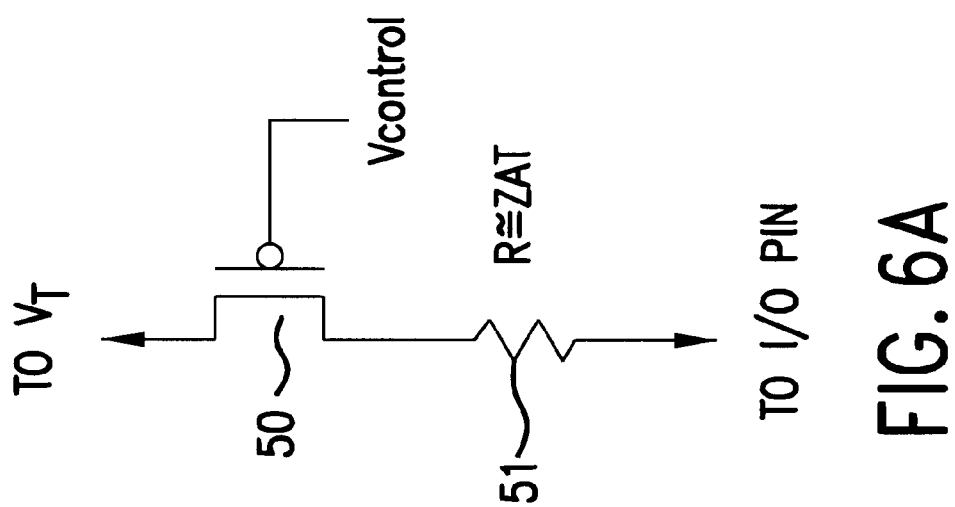

The active terminator itself may be implemented in many forms. FIGS. 6A and 6B are ready examples of circuits implementing the active terminator. In FIG. 6A, the circuit comprises resistor 51 having a selected resistance approximating the desired impedance $Z_{AT}$ and a switching element 50 receiving control signal $V_{cntrl}$ from the memory controller. Similarly, the circuit shown in FIG. 6B comprises only a switching element 53 providing the desired impedance $Z_{AT}$. In each of the examples, the circuit is connected between terminal voltage $V_T$ and the I/O pin to the data bus from the memory device, memory module, or slot. A coupling capacitor may be included in these circuits between $V_T$ and the switching element to reduce ON current.

Figure 7:
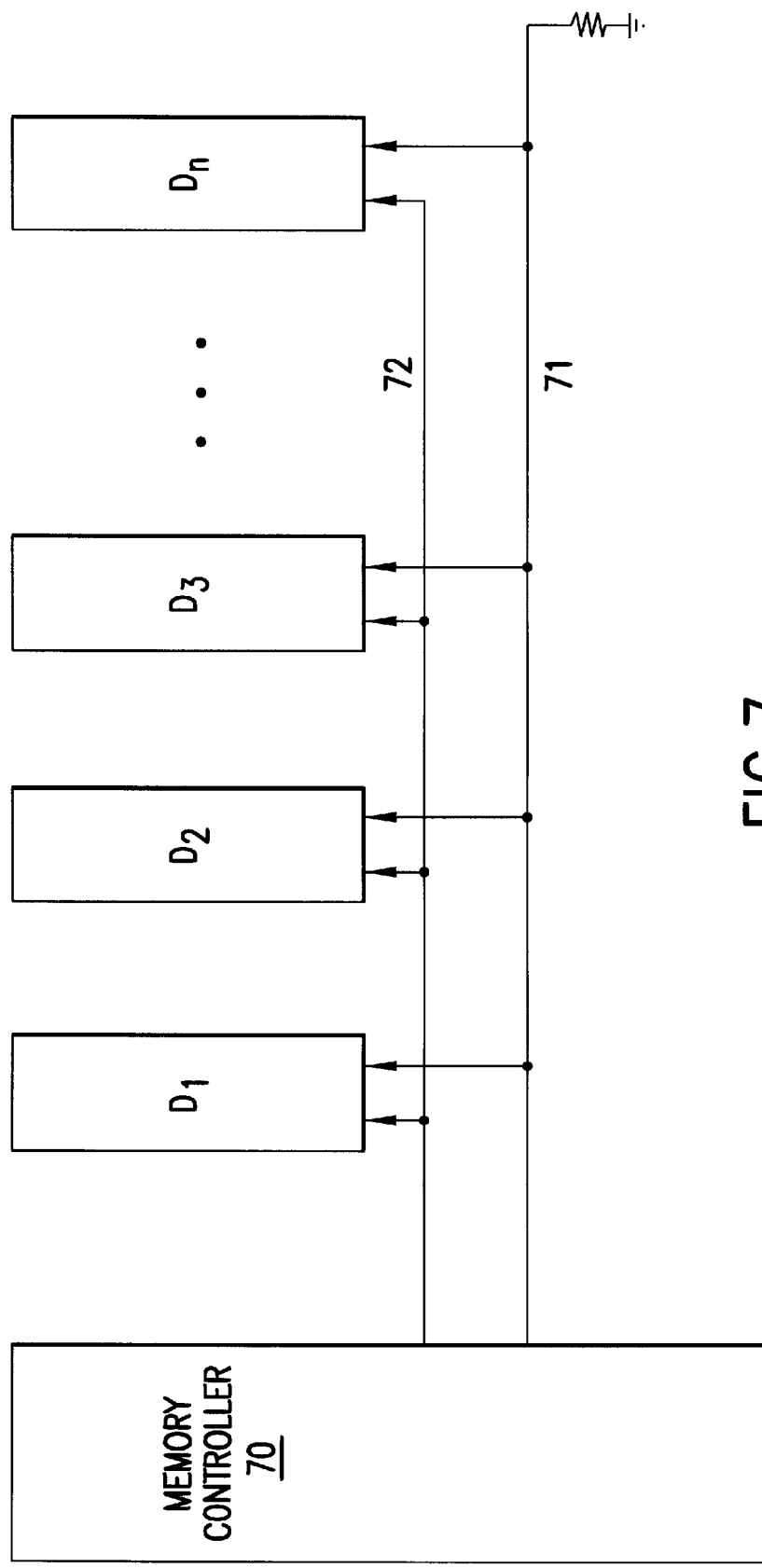

Activation or switching of the active terminator may be accomplished by the memory controller in several ways. For example, the memory controller 70 shown in FIG. 7 may use a serial initialization line (SIL) 72, or channel 71 to communicate an active terminal activation signal to any one of memory devices $D_1, D_2, D_3 \ldots D_N$.

Typically, the SIL or similar signal line connecting the memory devices with the memory controller outside channel 71 is used to assign a unique identification number to each memory device upon memory system initialization. Once memory system initialization is complete, the memory controller knows which memory device ($D_N$) is last on the data bus. With this information, the memory controller enables the active terminator in $D_N$ using the SIL. Alternatively, an appropriate command may be sent from the memory controller to memory device $D_N$ via the control/address portion of the channel in order to enable the active terminator. This command may be accompanied by data on the data bus portion of the channel, depending on the design of the particular command. Once received in memory device $D_N$, the enabling command may effect a register value of stored data value to activate the active terminator. Either of these signaling schemes may be applied to an active terminator in a memory module or slot.

Whether the active terminator is switched in the last memory device, the last memory module, or the last populated slot, memory devices on the data bus "see" balanced impedances as between sections of the data bus running towards the memory controller and the data bus terminator. Accordingly, the ½ $V_{SWING}$ signaling scheme explained above works well. Further, the matched impedances preclude undesired signal reflections on the data bus, thereby eliminating a potentially significant noise source.

What is claimed is:

1. A memory system comprising:
   a memory controller connected to a plurality of memory devices via a data bus, wherein the data bus terminates in the memory controller at a first end and at a resistive terminator at a second end;
   the data bus comprising a first portion having a first impedance, and a second portion having a second impedance;
   wherein at least one of the plurality of memory devices comprises an active terminator having a third impedance, such that upon activation of the active terminator, the third inpedance is placed in parallel with the second impedance to balance the first and second impedances.

2. The memory system of claim 1, wherein each one of the plurality of memory devices comprises an active terminator having the third impedance.

3. The memory system of claim 2, wherein the plurality of memory devices is arranged between the first and second ends of the data bus from a first memory device closest to the memory controller to a last memory device farthest from the memory controller.

4. The memory system of claim 3, wherein the memory controller comprises a first circuit for identifying the last memory device, and a second circuit for activating an active terminator in the last memory device.

5. The memory system of claim 1, further comprising:
   a termination voltage source connected to the resistive terminator.

6. The memory system of claim 5, wherein each one of the plurality of memory devices is connected to the data bus via a plurality of high impedance I/O circuits.

7. The memory system of claim 6, wherein each one of the high impedance I/O circuits comprises an open drain NMOS circuit.

8. A memory system comprising:
   a memory controller connected to a first end of a data bus;
   a resistive terminator connected to a second end of the data bus;
   wherein the data bus comprises a plurality of slots arranged between the first and second ends of the data bus, each slot being adapted to receive a memory module and comprising an active terminator responsive to a control signal from the memory controller.

9. The memory system of claim 8, further comprising a number of memory modules arranged in adjacent slots from a first memory module closest to the memory controller to a last memory module farthest from the memory controller;
   the memory controller further comprising: a first circuit for detecting a last populated slot holding the last memory module, and a second circuit for applying the control signal to an active terminator associated with the last populated slot.

10. A method of balancing impedance between first and second portions of a data bus in a memory system, the memory system comprising a memory controller and a plurality of memory devices connected via a serial initialization line and a channel including the data bus, wherein the data bus connects the memory controller at a first end and a resistive terminator at a second end, the method comprising:
    determining in the memory controller one memory device located last on the data bus closest to the resistive terminator; and,
    activating an active terminator in the one memory device to balance the first and second portions of the data bus.

11. The method of claim 10, wherein the step of determining in the memory controller one memory device located last on the data bus occurs during memory system initialization.

12. The method of claim 11, wherein prior to the step of determining in the memory controller one memory device located last on the data bus occurs during memory system initialization, the method further comprises: assigning each one of the plurality of memory devices a unique identification via the serial initialization line.

13. The method of claim 11, wherein prior to the step of determining in the memory controller one memory device located last on the data bus occurs during memory system initialization, the method further comprises: assigning each one of the plurality of memory devices a unique identification via the channel.

14. A method of operating a memory system wherein the memory system comprises;
    a memory controller connected to a first end of a data bus, and a resistive terminator connected to second end of the data bus, wherein the data bus comprises a first portion having a first impedance, and a second portion having a second impedance,
    a plurality of memory devices arranged along the data bus between the first and second ends from a first memory device closest to the memory controller to a last memory device closest to the resistive terminator,
    wherein each one of the plurality of memory devices comprises an active terminator having a third impedance;
    the method comprising:
    detecting the presence of the last memory device along the data bus; and
    activating the active terminator in the last memory device to combine the third impedance with the second impedance to balance the first and second impedances.

15. The method of claim 14, wherein each one of the plurality of memory devices comprises an individual memory device or a memory module comprising a plurality of memory devices.

16. The method of claim 15, wherein activating the active terminator in the last memory device comprises:
    generating a control signal in the memory controller; and
    applying the control signal to a switching component of the active terminator.

17. The method of claim 15, wherein detecting the presence of the last memory device along the data bus takes place during memory system initialization.

* * * * *